(12) United States Patent
Esposito

(10) Patent No.: US 11,157,476 B2
(45) Date of Patent: Oct. 26, 2021

(54) MARINE WEATHER RADAR AND SEA STATE DATA AGGREGATING SYSTEM

(71) Applicant: Honeywell International Inc., Morristown, NJ (US)

(72) Inventor: Carl Esposito, Phoenix, AZ (US)

(73) Assignee: Honeywell International Inc., Charlotte, NC (US)

( * ) Notice: Subject to any disclaimer, the term of this patent is extended or adjusted under 35 U.S.C. 154(b) by 464 days.

(21) Appl. No.: 14/687,799

(22) Filed: Apr. 15, 2015

(65) Prior Publication Data

US 2016/0306833 A1   Oct. 20, 2016

(51) Int. Cl.
*G06F 16/22* (2019.01)
*G06F 16/26* (2019.01)
(Continued)

(52) U.S. Cl.
CPC .......... *G06F 16/2264* (2019.01); *G01S 7/003* (2013.01); *G01S 7/04* (2013.01);
(Continued)

(58) Field of Classification Search
CPC ......... G06F 17/30333; G06F 17/30241; G06F 17/30572; G01S 13/956; G01S 13/95; G01S 7/003; G01S 7/04
(Continued)

(56) References Cited

U.S. PATENT DOCUMENTS 5,265,024 A   11/1993 Crabill et al.
5,530,909 A   6/1996 Simon et al.
(Continued)

FOREIGN PATENT DOCUMENTS

CN    103512562 A  *  9/2013
CN    103512562 A  *  1/2014
(Continued)

OTHER PUBLICATIONS

"The Garmin Marine Network, The Ultimate in Onboard Navigation Solutions," Garmin International Inc., retrieved from http://www8.garmin.com/marine/brochures/06542_MRN_network_brochure_v2.pdf on Jan. 29, 2015, 20 pp.
(Continued)

*Primary Examiner* — Ashish Thomas
*Assistant Examiner* — Abdullah A Daud
(74) *Attorney, Agent, or Firm* — Shumaker & Sieffert, P.A.

(57) ABSTRACT

This disclosure is directed to techniques for aggregating marine weather radar data and sea state sensor data from ships or other sea-based data collecting nodes, potentially also with non-sea-based data collecting nodes. In one example, a system is configured to receive, via a remote coverage broadband datalink system, one or more sets of marine environmental condition data from one or more sea-based data collecting nodes. The system is further configured to aggregate the one or more sets of marine environmental condition data from the one or more sea-based data collecting nodes into one or more aggregated sets of marine environmental condition data. The system is further configured to output at least one of the aggregated sets of marine environmental condition data to one or more recipient systems.

14 Claims, 6 Drawing Sheets

(51) Int. Cl.
  *G06F 16/29* (2019.01)
  *G01S 13/87* (2006.01)
  *G01S 7/00* (2006.01)
  *G01S 13/95* (2006.01)
  *G01S 7/04* (2006.01)

(52) U.S. Cl.
  CPC ............ *G01S 13/87* (2013.01); *G01S 13/956* (2013.01); *G06F 16/26* (2019.01); *G06F 16/29* (2019.01); *G01S 13/95* (2013.01); *Y02A 90/10* (2018.01)

(58) Field of Classification Search
  USPC ........................................................ 707/746
  See application file for complete search history.

(56) References Cited

U.S. PATENT DOCUMENTS

| | | | |
|---|---|---|---|
| 5,657,009 A | 8/1997 | Gordon | |
| 6,014,606 A | 1/2000 | Tu | |
| 6,043,756 A | 3/2000 | Bateman et al. | |
| 6,441,773 B1 | 8/2002 | Kelly et al. | |
| 6,448,922 B1 | 9/2002 | Kelly | |
| 6,501,392 B2 | 12/2002 | Gremmert et al. | |
| 6,536,272 B1* | 3/2003 | Houston | G01N 1/12 |
| | | | 702/2 |
| 6,720,920 B2 | 4/2004 | Breed et al. | |
| 6,721,559 B1 | 4/2004 | Kocin et al. | |
| 6,828,922 B1 | 12/2004 | Gremmert et al. | |
| 6,977,608 B1 | 12/2005 | Anderson et al. | |
| 7,047,114 B1 | 5/2006 | Rogers | |
| 7,069,147 B2 | 6/2006 | Manfred et al. | |
| 7,084,775 B1 | 8/2006 | Smith | |
| 7,302,493 B1* | 11/2007 | Alles | H04L 47/10 |
| | | | 370/389 |
| 7,365,675 B2 | 4/2008 | Pearlman et al. | |
| 7,406,382 B2 | 7/2008 | Brulle-Drews | |
| 7,612,731 B2* | 11/2009 | Peterson | H01Q 1/52 |
| | | | 343/840 |
| 7,633,428 B1 | 12/2009 | McCusker et al. | |
| 7,633,430 B1 | 12/2009 | Wichgers et al. | |
| 7,817,078 B2 | 10/2010 | Bunch | |
| 8,022,859 B2 | 9/2011 | Bunch et al. | |
| 8,085,182 B2 | 12/2011 | Kauffman | |
| 8,130,121 B2 | 3/2012 | Smith et al. | |
| 8,180,507 B2 | 5/2012 | Dokken | |
| 8,203,480 B1 | 6/2012 | Woodell et al. | |
| 8,217,828 B2 | 7/2012 | Kirk | |
| 8,286,218 B2* | 10/2012 | Pizzurro | H04N 21/234318 |
| | | | 725/135 |
| 8,314,730 B1* | 11/2012 | Musiak | G01S 13/953 |
| | | | 342/25 B |
| 8,332,087 B2 | 12/2012 | Yannacone, Jr. et al. | |
| 8,604,963 B1 | 12/2013 | Kronfeld et al. | |
| 8,629,788 B1 | 1/2014 | Greenleaf et al. | |
| 8,831,795 B2 | 9/2014 | Cabos | |
| 9,223,020 B1 | 12/2015 | Crosmer et al. | |
| 9,256,004 B2 | 2/2016 | Agarwal et al. | |
| 9,535,158 B1 | 1/2017 | Breiholz et al. | |
| 9,689,984 B1* | 6/2017 | Breiholz | G01S 13/865 |
| 9,952,310 B2* | 4/2018 | Wang | G01S 13/95 |
| 2002/0101826 A1* | 8/2002 | Giacopelli | H04L 47/765 |
| | | | 370/252 |
| 2004/0244476 A1 | 12/2004 | Andrews et al. | |
| 2007/0288978 A1* | 12/2007 | Pizzurro | H04N 21/64322 |
| | | | 725/112 |
| 2008/0035784 A1 | 2/2008 | Meserole et al. | |
| 2008/0077995 A1* | 3/2008 | Curnyn | H04L 63/1441 |
| | | | 726/27 |
| 2008/0147257 A1 | 6/2008 | Kuhlgatz et al. | |
| 2008/0239388 A1* | 10/2008 | Kudo | G06F 3/1212 |
| | | | 358/1.15 |
| 2008/0255714 A1 | 10/2008 | Ross | |
| 2010/0042275 A1 | 2/2010 | Kirk | |
| 2010/0052891 A1* | 3/2010 | Chainer | G01V 3/00 |
| | | | 340/517 |
| 2010/0144912 A1 | 6/2010 | Kawasumi et al. | |
| 2010/0245164 A1 | 9/2010 | Kauffman | |
| 2010/0332056 A1 | 12/2010 | Kirk | |
| 2011/0035187 A1* | 2/2011 | Dejori | G01D 9/005 |
| | | | 702/187 |
| 2011/0074624 A1 | 3/2011 | Bunch | |
| 2011/0161833 A1 | 6/2011 | Dheap et al. | |
| 2012/0179652 A1* | 7/2012 | Glaude | G06F 16/275 |
| | | | 707/626 |
| 2012/0239285 A1 | 9/2012 | Oster | |
| 2013/0338920 A1 | 12/2013 | Pasken et al. | |
| 2014/0358441 A1* | 12/2014 | Hale | G01W 1/10 |
| | | | 702/3 |
| 2015/0074191 A1* | 3/2015 | Feng | H04L 63/102 |
| | | | 709/204 |
| 2015/0161150 A1* | 6/2015 | Goering | G06F 16/29 |
| | | | 707/743 |
| 2015/0304813 A1* | 10/2015 | Esposito | G01S 13/951 |
| | | | 455/456.2 |
| 2016/0070010 A1* | 3/2016 | Calupca | A01M 31/002 |
| | | | 367/14 |
| 2016/0073271 A1* | 3/2016 | Schultz | H04W 4/90 |
| | | | 455/404.1 |
| 2016/0182297 A1* | 6/2016 | Dauneria | H04L 41/0826 |
| | | | 709/224 |

FOREIGN PATENT DOCUMENTS

| | | | | |
|---|---|---|---|---|
| EP | | 2157453 A2 | 2/2010 | |
| EP | | 2290636 A1 | 3/2011 | |
| EP | | 2575120 A1 | 4/2013 | |
| WO | | 00013047 A1 | 3/2000 | |
| WO | WO 2011019111 A1 * | | 2/2011 | ............ G06T 11/00 |

OTHER PUBLICATIONS

"Voluntary Observations from Mariners," NOAA National Weather Service, retrieved from http://www.nws.noaa.gov/om/marine/voluntary.htm on Jan. 30, 2015, 4 pp.

Chang et al., "Implementation of AIS-based Marine Meteorological Applications," Oceans 2014, IEEE, Apr. 7, 2014, 4 pp.

Extended Search Report from counterpart European Application No. 16163949.7, dated Jul. 29, 2016, 9 pp.

U.S. Appl. No. 15/220,201, filed by Wang et al., filed Jul. 26, 2016.

Response to Communication pursuant to Rules 70(2) and 70a(2) EPC dated Oct. 24, 2016, from counterpart European Application No. 16163949.7, filed on Mar. 29, 2017, 15 pp.

Intent to Grant and Text Intended to Grant from counterpart European Application No. 16163949.7, dated Apr. 3, 2019, 35 pp.

Response to Examination Report dated Aug. 1, 2018, from counterpart European Application No. 16163949.7, filed Dec. 4, 2018, 15 pp.

Communication pursuant to Article 94(3) from counterpart European Patent Application No. 16163949.7, dated Aug. 1, 2018, 4 pp.

* cited by examiner

MARINE WEATHER RADAR AND SEA STATE DATA AGGREGATING SYSTEM

This disclosure relates to weather radar systems.

BACKGROUND

Many marine vessels, such as ocean-going ships, are equipped with onboard weather radar systems as well as other onboard sea state sensors. A marine onboard weather radar system may be configured to provide radar reflectivity data indicative of weather ahead of the marine vessel within the radar sensor range of the weather radar system. The weather information can include information about detectable weather phenomena such as convective weather cells, turbulence regions, clouds, precipitation, hail, snow, icing conditions, and wind shear. The other sea slate sensors may detect sea state parameters such as sea wave height, direction of sea currents, and sea water temperature. These onboard weather radar systems and onboard sea state sensors may help the crew of a marine vessel autonomously plan and execute long range strategic operation of the craft, including by characterizing the weather and sea state and helping avoid inclement weather and sea state conditions.

SUMMARY

This disclosure is directed to techniques, systems, devices, and methods for a centralized system for aggregating marine environmental condition data including weather radar data and sea state sensor data from sea-going ships and other sea-based radar and sensor nodes, and making the aggregated data available to the ships and other subscribers. Oceans and other seas have traditionally had only sparse weather radar and sea state sensor coverage, and low-bandwidth communication availability. Ocean-going ships and other sea-going ships have often had to rely heavily on their own weather radar and sea state sensors, which have limited range. A marine environmental condition data aggregating system of this disclosure may aggregate the data from those ships, and from additional ground-based, airborne, or space-based weather radar and/or sea state sensor nodes, and provide the aggregated data to the ships and other subscribers, thus providing a much more wide-ranging and detailed set of up-to-date information on marine environmental conditions. A marine environmental condition data aggregating system of this disclosure may receive the data from the ships and other data collecting nodes and transmit the aggregated data via broadband telecommunication satellites with high data rates that enable rapid gathering and dissemination of large, rich sets of weather radar and sea state sensor data.

The marine environmental condition data aggregating system may aggregate marine environmental condition data as follows, in some examples. The marine environmental condition data aggregating system may receive multiple transmissions of marine environmental condition data over time and store the marine environmental condition data in a data store. The marine environmental condition data aggregating system may also identify geographic and time references in the marine environmental condition data it receives via the remote broadband datalink system, and coordinate the data front multiple nodes by the geographic and time references in the process of aggregating the data. The marine environmental condition data aggregating system may thus assemble the data from multiple nodes into a single large geographic and time referenced data set. The marine environmental condition data aggregating system may communicate the aggregated marine environmental condition data set, or portions thereof, to subscribers or other recipients, such as sea-going ships, offshore platform operators, weather information services, and search and rescue agencies, for example.

One example is directed to a system configured to receive, via a remote coverage broadband datalink system, one or more sets of marine environmental condition data front one or more sea-based data collecting nodes. The system is further configured to aggregate the one or more sets of marine environmental condition data from the one or more sea-based data collecting nodes into one or more aggregated sets of marine environmental condition data. The system is further configured to output at least one of the aggregated sets of marine environmental condition data to one or more recipient systems.

Another example is directed to a device comprising a computer-readable medium having program code stored thereon, the device configured for the program code to be executable by one or more processors to receive, via a remote coverage broadband datalink system, one or more sets of marine environmental condition data from one or more sea-based data collecting nodes. The program code is further executable by the one or more processors for causing the one or more processors to aggregate the one or more sets of marine environmental condition data from the one or more sea-based data collecting nodes into one or more aggregated sets of marine environmental condition data. The program code is further executable by the one or more processors for causing the one or more processors to output at least one of the aggregated sets of marine environmental condition data to one or more recipient systems.

In another example, a method includes receiving, by one or more processors, via a remote coverage broadband datalink system, one or more sets of marine environmental condition data from one or more sea-based data collecting nodes. The method further includes aggregating, by the one or more processors, the one or more sets of marine environmental condition data from the one or more sea-based data collecting nodes into one or more aggregated sets of marine environmental condition data. The method further includes outputting, by the one or more processors, at least one of the aggregated sets of marine environmental condition data to one or more recipient systems The disclosure is also directed to an article of manufacture comprising a computer-readable storage medium. The computer-readable storage medium comprises computer-readable instructions that are executable by a processor. The instructions cause the processor to perform any part of the techniques described herein. The instructions may be, for example, software instructions, such as those used to define a software or computer program. The computer-readable medium may be a computer-readable storage medium such as a storage device (e.g., a disk drive, or an optical drive), memory (e.g., a Flash memory, read only memory (ROM), or random access memory (RAM)) or any other type of volatile or non-volatile memory or storage element that stores instructions (e.g., in the form of a computer program or other executable) to cause a processor to perform the techniques described herein. The computer-readable medium may be a non-transitory storage medium.

The details of one or more examples are set forth in the accompanying drawings and the description below. Other features, objects, and advantages will be apparent from the description and drawings, and from the claims.

DETAILED DESCRIPTION

Marine environmental condition data aggregating techniques, systems, devices, and methods of this disclosure may aggregate marine weather radar data and sea state sensor data from various ships and other data collecting nodes at sea or with observational coverage of marine areas, and output the aggregated marine environmental condition data sets, thereby providing accurate and up-to-date aggregated marine environmental condition to ships at sea and other marine assets or subscribers. Various examples of marine environmental condition data aggregating techniques, systems, devices, and methods are further described below.

Figure 1:
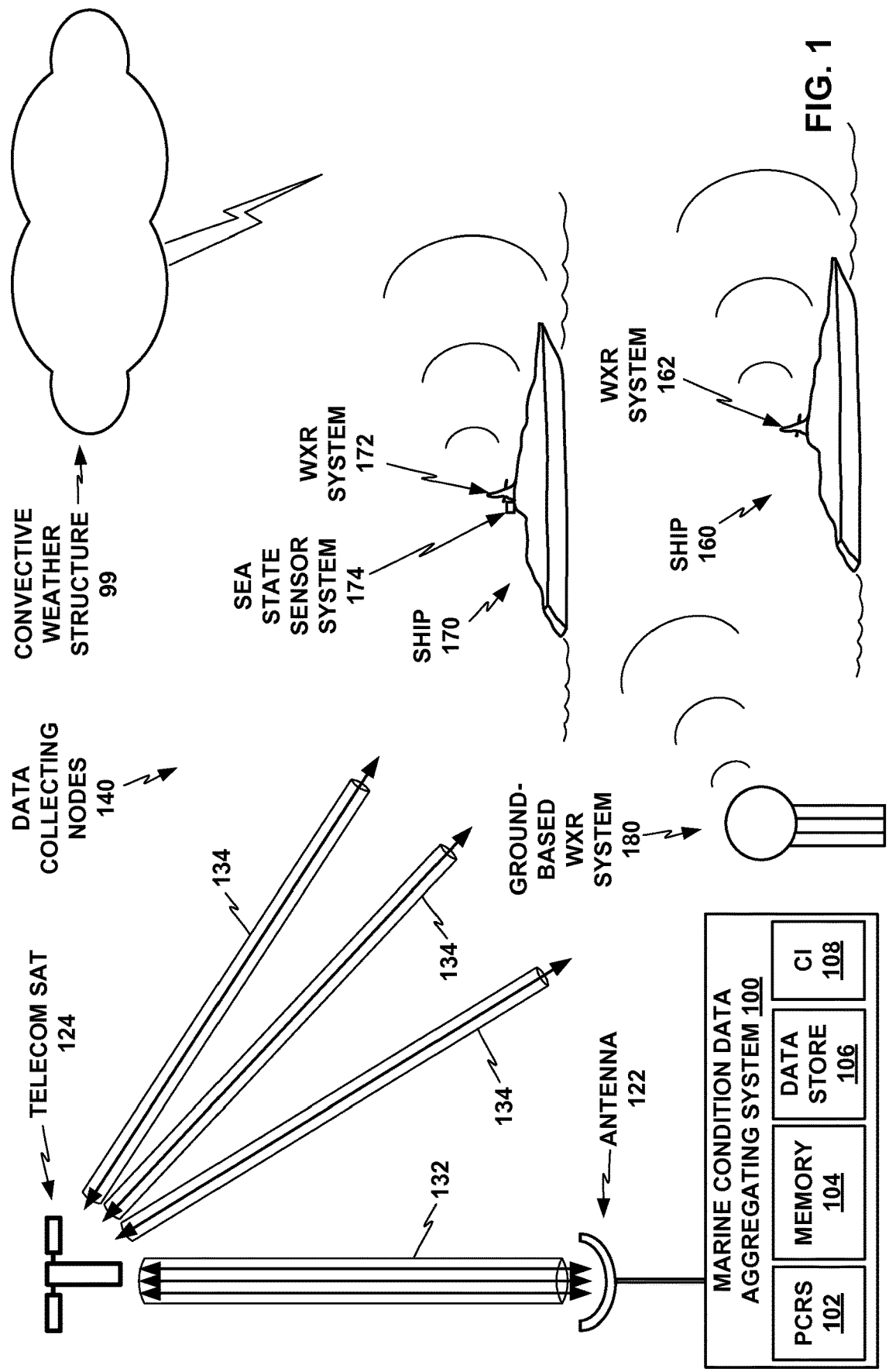
FIG. 1 depicts a conceptual block diagram of an example marine environmental condition data aggregating system configured for receiving weather radar and sea state sensor data from various data collecting nodes including ships and ground-based weather radar, and transmitting aggregated marine environmental condition data back to the ships, in one example.

FIG. 1 depicts a conceptual block diagram of an example marine environmental condition data aggregating system 100 configured for receiving weather radar and sea state sensor data front various sea-based data collecting nodes 140 including ships 160, 170 and a ground-based weather radar (WXR) system 180, and transmitting aggregated marine environmental condition data back to the ships 160, 170, in one example. Ships 160, 170 and ground-based WXR system 180 as shown in FIG. 1 are representative examples of marine environmental condition data collecting nodes 140, and may include any number of ships, ground-based WXR systems, sea-based platforms (e.g., oil and/or gas platforms), aircraft flying routes at least partially over or proximate to sea areas, and various other vehicles and assets. Weather radar data taken at sea or covering marine environments, and sea state data taken by in situ or remote sea state sensors, may collectively be referred to as marine environmental condition data, for purposes of this disclosure.

As shown in FIG. 1, marine environmental condition data aggregating system 100 (or "marine condition data aggregating system 100") includes one or more processors 102 (e.g., CPUs), one or more memory components 104, one or more data stores 106 (e.g., databases or schemaless data stores), and a communication interface (CI) 108 (e.g., a Ka band radio interface), and is connected to an antenna 122. Marine condition data aggregating system 100 is thus configured to maintain a broadband datalink connection 132 with telecommunication satellite ("telecom sat") 124. Telecom sat 124 may be equipped with broadband capability such as including Ka band datalink transmission and reception capability. In one example, telecom sat 124 may be a Global Xpress (GX) satellite operated by Inmarsat PLC. Telecom sat 124 may be in geosynchronous Earth orbit (GEO) and may provide coverage over a large area of the Earth in some examples, and may interoperate with additional comparable telecom sats that provide complementary coverage over other large sections of the Earth, in some examples. This may include telecom sat 124 providing coverage over large areas of ocean and other large seas and large lakes. Telecom sat 124 may be considered a remote coverage broadband datalink system because it provides a broadband datalink connection to remote areas such as the oceans. Marine condition data aggregating system 100 may also be configured to operate with other types of remote coverage broadband datalink systems such as broadband datalink connections implemented by drones or automated airships remotely operating near or over the ocean, for example.

Telecom sat 124 may also establish broadband datalink connections 134 with various data collecting nodes 140 such as ships 160, 170 and ground-based WXR system 180. Data collecting nodes 140 may thus transmit broadband data via telecom sat 124 to marine condition data aggregating system 100.

Ship 160 is equipped with a weather radar (WXR) system 162, and may operate WXR system 162 to collect radar data characterizing the weather proximate to and along the heading of ship 160. Ship 160 may have systems configured to process weather radar data it collects and automatically transmit the weather radar data via telecom sat 124 to marine condition data aggregating system 100. Ship 170 may be operating proximate to (e.g., within several miles or tens of miles or more of) ship 160 or its heading. Ship 170 in this example is equipped with a WXR system 172 as well as a sea state sensor system 174. Sea state sensor system 174 may include electrical, mechanical, infrared, and other sensors that may collect sea state sensor data including data on sea wave height, sea wave period, direction of sea currents, and sea water temperature, for example. Sea state sensors may also include electro-mechanical sensors that determine sea state conditions such as the height, period, and direction of waves in the sea. Sea state sensors may also include wind speed sensors; submerged thermometers, infrared sensors, or other sensors of the water temperature; and radiosounding sensors that may measure variations in atmospheric refraction that may affect weather radar, to enable precision corrections to the interpretation of weather radar data. Ship 170 may have systems configured to process both weather radar data and sea state data it collects and automatically transmit the weather radar data and sea state data via telecom sat 124 to marine condition data aggregating system 100.

Ground-based weather radar system 180 may be part of a network of ground-based weather radar systems such as the Next Generation Weather Radar System (NexRad) radar network operated by the National Weather Service in the United States, for example. Ground-based weather radar system 180 may be stationed in or near a coastal area and may have a range of about 140 miles (about 230 kilometers) in one example, which may extend out over a significant area of ocean or other sea. Marine condition data aggregating system 100 may have a data connection with ground-based weather radar system 180 via telecom sat 124 or via a network such as the Internet.

Ships 160 and 170 may be operating relatively proximate to, e.g., within 100 miles of, each other and ground-based weather radar system 180 in a given interval of time, and may all collect data that covers a convective weather structure 99 over an area of the ocean. The data collected may include weather radar data from ships 160 and 170 and from ground-based weather radar system 180, as well as sea state sensor data from ship 170, collectively, marine environmental condition data. Ships 160 and 170 and ground-based weather radar system 180 may all transmit their marine environmental condition data to marine condition data aggregating system 100.

Marine condition data aggregating system 100 may be ground-based, e.g., at a centralized marine weather and sea state information service provider, or at a shipping company operations center, in some examples. Marine condition data aggregating system 100 may receive the marine environmental condition data from ships 160 and 170 and ground-based weather radar system 180, and potentially from one or more additional data collecting nodes 140, via telecom sat 124. Processors 102 and memory 104 of marine condition data aggregating system 100 may aggregate the data, store the aggregated data in data store 106, and output the aggregated marine environmental condition data to recipients, including ships 160 and 170 in this example. Example functions of marine condition data aggregating system 100 to aggregate and output the marine environmental condition data are further described below with reference to FIG. 2.

Figure 2:
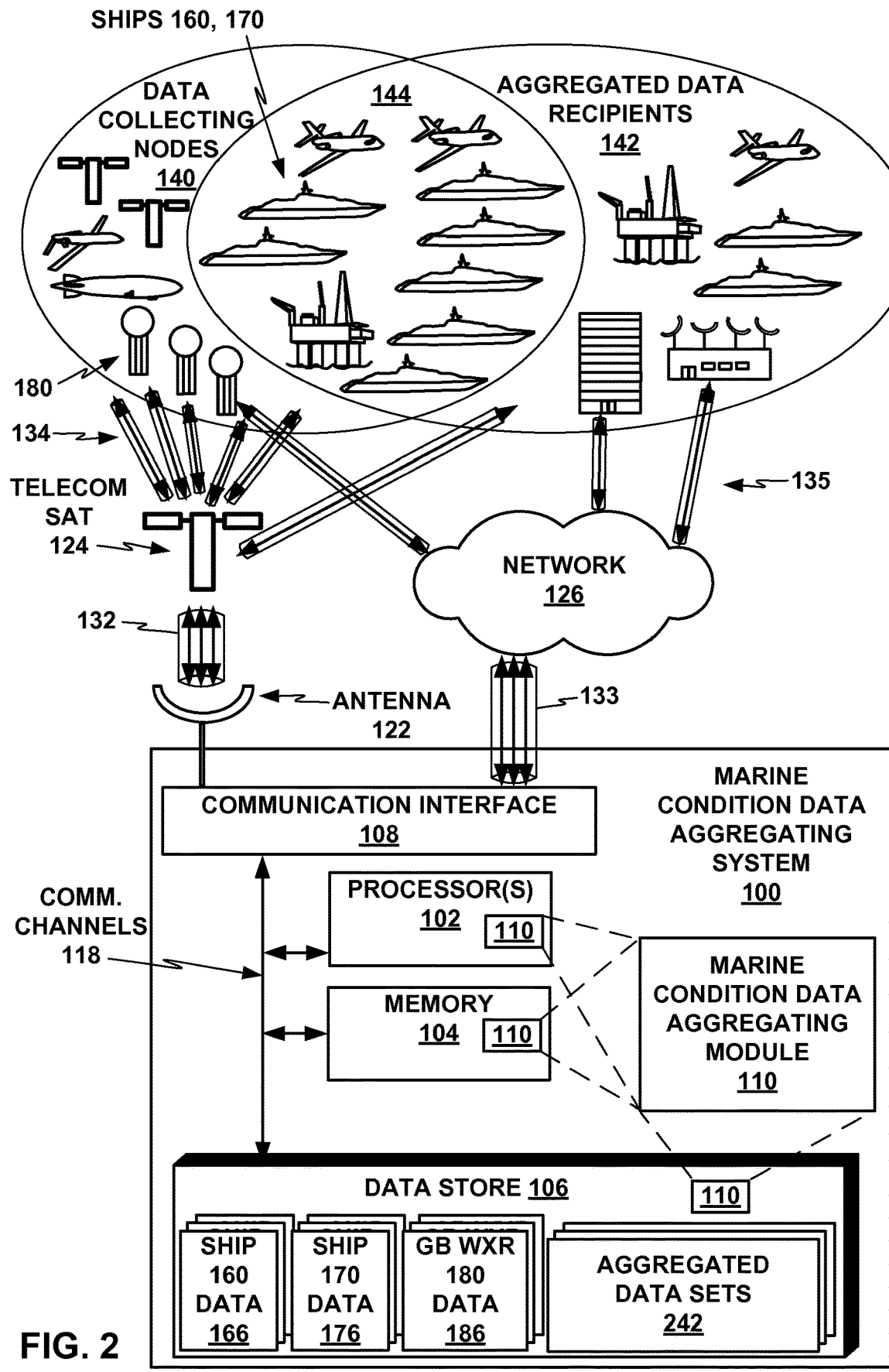
FIG. 2 depicts a conceptual block diagram of a marine environmental condition data aggregating system configured for receiving marine environmental condition data from various ships and other data collecting nodes, aggregating the data, and transmitting the aggregated marine environmental condition data back to the ships and various other recipients, in one example.

FIG. 2 depicts a conceptual block diagram of a marine environmental condition data aggregating system 100 configured for receiving marine environmental condition data from various ships and other data collecting nodes 140, aggregating the data, and transmitting the aggregated marine environmental condition data back to the ships and various other recipients 142, in one example. Marine environmental condition data aggregating system 100 (or "marine condition data aggregating system 100") as shown in FTC. 2 may be a more detailed view of the same marine condition data aggregating system 100 as shown in FIG. 1. There may be a substantial overlap 144 between the marine condition data collecting nodes 140 and the aggregated data recipients 142, as indicated in Venn diagram form in FIG. 2.

Marine condition data collecting nodes 140 that transmit data to marine condition data aggregating system 100 may include sea-based data collecting nodes such as ships 160, 170 and ground-based weather radar system 180 of FIG. 1, along with various additional representative data collecting nodes including additional sea-based, ground-based, air-based, and space-based data collecting nodes. The sea-based data collecting nodes may include additional ships, sea platforms (e.g., oil and/or gas platforms), submarines, boats, and automated sea-going devices (e.g., automated data collecting buoys or robotic boats). The ground-based collecting nodes may include additional ground-based weather radar systems, for example. The air-based data collecting nodes may include aircraft, drones, airships (e.g., dirigibles or blimps, which may be automated), or weather balloons that may be equipped with weather radar systems and/or remote sea state sensors, such as infrared or microwave sensors, for example. The space-based data collecting nodes may include sub-orbital sounding rockets, weather satellites, or other types of Earth observing satellites that collect data on marine conditions and that may also be equipped with remote sea state sensors such as infrared or microwave sensors, for example. In various examples, marine condition data aggregating system 100 may receive marine condition data from various implementations of any or all of these types of data collecting nodes.

Marine condition data aggregating system 100 may transmit aggregated marine environmental condition data to aggregated data recipients 142, including those in overlap group 144 who also act as data collecting nodes, as well as to additional recipients who are not involved in collecting and sending data to marine condition data aggregating system 100. Those additional aggregated data recipients 142 may include shipping operations centers, marine weather information service providers, commercial weather reporting services and news services, and remote search and rescue services, for example, as well as some additional ships, sea platforms, aircraft, some sea-going boats including those that may be too small to carry weather radar or sophisticated sea state sensors, or other vehicles or assets. As in FIG. 1, marine condition data aggregating system 100 receives data from data collecting nodes 140 and outputs data to aggregated data recipients 142 via broadband datalink connections 132, 134 provided via telecom sat 124. Marine condition data aggregating system 100 may also receive data from certain data collecting nodes 140 such as ground-based weather stations, and may also output data to certain aggregated data recipients 142, such as offices of shipping operations centers or marine weather information service providers, via network 126, such as the Internet.

Marine condition data aggregating system 100 may process incoming data and outgoing data via communication interface 108, which may include interface subsystems for managing data communication via both antenna 122 and telecom sat 124, and via network 126. Marine condition data aggregating system 100 may include communication channels, such as a bus or communication fabric, for transporting data and instruction code between one or more processors 102 ("processors 102"), one or more memory components 104 ("memory 104"), and one or more data stores 106 ("data stores 106"). Processors 102 may include one or more central processing units (CPUs), one or more CPU cores, one or more graphical processing units (CPUs), or any other type of processing units. Memory 104 may include any form of working memory, such as any form of random access memory (RAM). Data stores 106 may include any databases, schemaless data stores, or any data storage, implemented on any form of hard disc drives, redundant array of independent discs (RAID), Flash drives, cloud storage, or any other form of data storage.

Marine condition data aggregating system 100 also includes a marine condition data aggregating module 110. Marine condition data aggregating module 110 may include an executable software application, portions of an executable software application, a library of multiple executable software applications and associated classes, methods, processes, functions, routines, or other resources, or any other body of executable software code. Marine condition data aggregating module 110 may be stored in data stores 106 and/or loaded in memory 104 for execution by processors 102. Marine condition data aggregating module 110 may configure processors 102 to receive incoming marine environmental condition data, aggregate the marine environmental condition data, output the marine environmental condition data, and perform any of the functions described herein. For example, marine condition data aggregating module 110 may receive and store sets of data 166 from ship 160, sets of data 176 from ship 170, sets of data 186 from ground-based WXR system 180, additional sets of data from any number of other data collecting nodes, and may aggregate data from those data sets into aggregated data sets 242. This is further described below with reference to FIG. 3.

Figure 3:
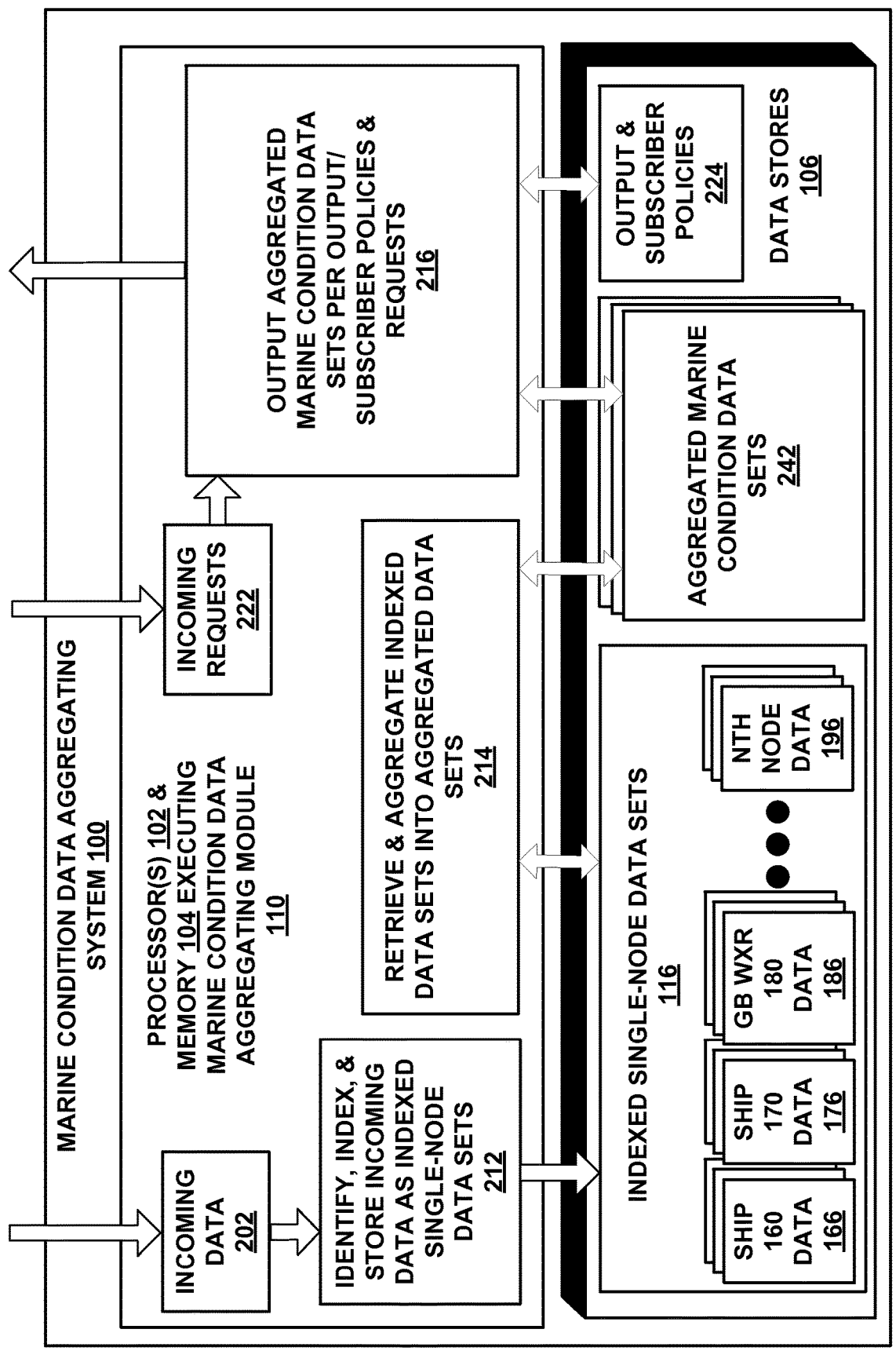
FIG. 3 depicts a conceptual block diagram of a marine environmental condition data aggregating system configured to receive, identify, index, and store incoming marine environmental condition data; aggregate the indexed data into aggregated marine environmental condition data sets; and output the aggregated marine environmental condition data sets in accordance with output and subscriber policies and incoming requests, in one example.

FIG. 3 depicts a conceptual block diagram of a marine environmental condition data aggregating system 100 configured to receive, identify, index, and store incoming marine environmental condition data; aggregate the indexed data into aggregated marine environmental condition data sets; and output the aggregated marine environmental condition data sets in accordance with output and subscriber policies and incoming requests, in one example. Marine environmental condition data aggregating system 100 includes processors 102, using memory 104, executing marine condition data aggregating module 110. Marine environmental condition data aggregating system 100 further includes data stores 106. Processors 102 may receive incoming data 202 (e.g., marine environmental condition data from any of the data collecting nodes 140), and execute a portion 212 of marine condition data aggregating module 110 that configure processors 102 to identify, index, and store the incoming data as indexed single-node (e.g., from a single data collecting node) data sets, among indexed single-node data sets 116 in data stores 106. These may include sets of data 166 from ship 160, sets of data 176 from ship 170, sets of data 186 from ground-based WXR system 180, and additional sets of data from any number of other data collecting nodes, up to sets of data 196 from an Nth data collecting node from among data collecting nodes 140.

Processors 102 may execute another portion 214 of marine condition data aggregating module 110 that configure processors 102 to retrieve and aggregate the indexed data sets 116 into aggregated marine environmental condition data sets 242. Thus, in this example, marine condition data aggregating module 110 is configured to aggregate the data asynchronously front receiving, identifying, indexing, and storing the incoming data, which may enable flexibility to take advantage of varying rates of incoming data, in some examples. In other examples, marine condition data aggregating module 110 may aggregate incoming data as it is received, without or apart from separately indexing and storing the single-node data sets.

Processors 102 may execute another portion 216 of marine condition data aggregating module 110 that configure processors 102 to output aggregated marine condition data sets in accordance with output policies and subscriber policies 224 and requests 222. The output and subscriber policies 224 may also be stored in data stores 106. The output policies may include parameters for what aggregated data to output in what manner outside of subscriber policies, such as posting or streaming certain data to a non-subscriber website.

The subscriber policies may include identifying information on subscriber accounts and their associated recipient systems, selected levels and schedules of automated data outputs associated with the subscriber accounts, and selected parameters to apply to the outputs for various subscriber accounts, for example. Marine condition data aggregating module 110 may perform security, validation, and authentication functions to enable subscribers to receive or to decode aggregated marine condition data outputs. In some examples, marine condition data aggregating module 110 may identify a present location of a recipient system associated with a given subscriber, and output a customized aggregated set of marine environmental condition data to the recipient system associated with the subscriber, such that the customized aggregated set of marine environmental condition data is customized to the present location of the recipient system associated with the subscriber at the present time.

In some examples, marine condition data aggregating module 110 may maintain among output and subscriber policies 224 subscriber policies that identify subscribers with primarily real-time operational interest and subscribers with primarily archival interest. Marine condition data aggregating module 110 may customize aggregated sets of marine environmental condition data for subscribers with primarily real-time operational interest based on present locations of recipient systems associated with the subscribers and based on present times. Marine condition data aggregating module 110 may also customize aggregated sets of marine environmental condition data for subscribers with primarily archival interest based on selected archival data parameters.

The incoming requests may be HTTP requests that may be sent by subscribers or their recipient systems, via telecom sat 124 or network 126, specifying certain time intervals and/or geographic regions for which to request a customized aggregated marine environmental condition data set, potentially outside of what is automatically provided by marine environmental condition data aggregating system 100 in accordance with their subscriber policies.

Figure 4:
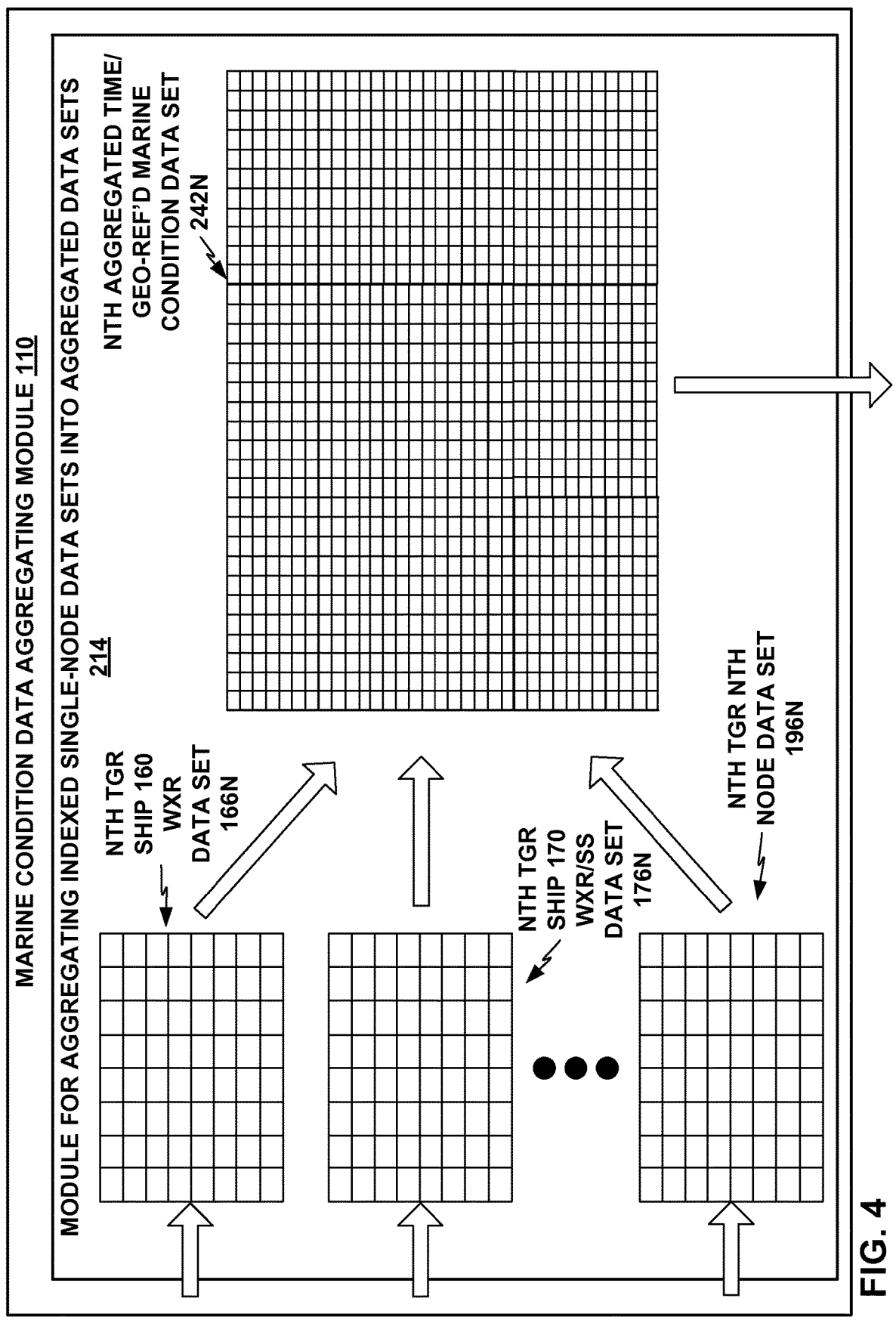
FIG. 4 depicts a conceptual diagram of a marine environmental condition data aggregating module that includes a module for aggregating indexed single-node data sets into an aggregated marine environmental condition data set, in one example.

FIG. 4 depicts a conceptual diagram of a marine environmental condition data aggregating module 110 that includes a module 214 for aggregating indexed single-node data sets 166N, 176N, . . . , 196N into an aggregated marine environmental condition data set 242N, in one example. FIG. 4 shows an additional view of the operation of module 214 shown in FIG. 3, in one example. Single-node data sets 166N, 176N, and 196N each includes a single set of data received from a single node from among data collecting nodes 140, including ship 160, ship 170, and an Nth data collecting node which may be any of data collecting nodes 140 shown in FIG. 2 or described above. Accordingly, single-node data set 166N is a WXR data set only (front ship 160), while single-node data set 176N includes both WXR data and sea state sensor data (from ship 170).

Single-node data sets 166N, 176N, and 196N are also time referenced and geographically referenced, such that they include identifying data or metadata matching them with certain times and geographical areas of where they were collected. These time references and geographic references in the metadata of the data sets may be included by the data collecting nodes in their data processing prior to transmitting the data to marine environmental condition data aggregating system 100. Data sets 166N, 176N, and 196N are conceptually depicted in grid form in FIG. 4 to indicate that they are Earth-referenced volumetric data sets in which the data may be implemented in the form of arrays, vectors, or other ordered form that preserves the three-dimensional Earth-referenced volumetric geographical form of the data, representing and referencing the three-dimensional geographical volume of air and sea from which the data set was taken.

As part of aggregating the single-node data sets, marine environmental condition data aggregating module 110 may match data sets from multiple nodes from the same point or interval in time, whether or not received asynchronously by marine condition data aggregating system 100, and where the nodes were proximate to each other when the data sets were collected, such that marine environmental condition data aggregating module 110 is able to combine or stitch together data from multiple nodes covering the same or overlapping geographical areas at the same times, as in Nth aggregated time-referenced and geographically-referenced marine condition data set 242N. Aggregated marine condition data set 242N is conceptually depicted as both larger and more highly sub-divided than single-node data sets 166N, 176N, 196N to represent that aggregated marine condition data set 242N may cover a much larger geographical range and with higher resolution over at least parts of that range, by combining the data from the multiple sources, where and when they overlap. Marine environmental condition data aggregating module 110 is thus able to implement and output larger-range and higher-resolution marine condition data sets than any of the single data collecting nodes are able to generate on their own.

Figure 5:
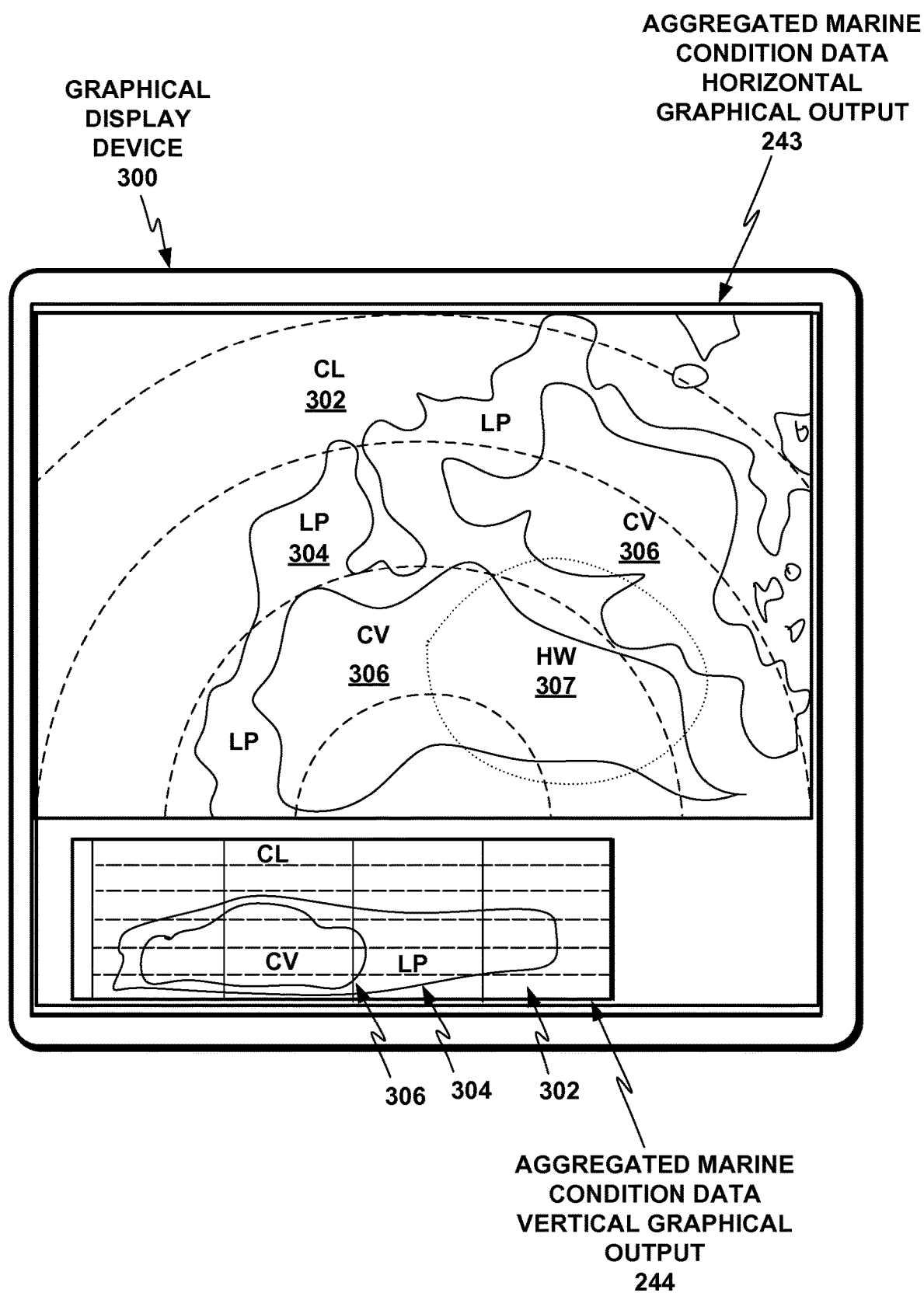
FIG. 5 shows a conceptual diagram of a client graphical display device displaying a graphical output based on an aggregated marine environmental condition data set, in one example.

FIG. 5 shows a conceptual diagram of a client graphical display device 300, which may be onboard a recipient ship (e.g., ships 160, 170) or otherwise included in or co-located with an aggregated data recipient, displaying a graphical output 243, 244 based on an aggregated marine environmental condition data set such as aggregated marine condition data set 242N of FIG. 4, in one example. Graphical output 243, 244 includes a horizontal graphical output 243 and a vertical graphical output 244 both based on the same aggregated marine condition data set. The data set may also be four-dimensional, showing recent changes over time in the applicable or selected three-dimensional volume of space, such as selectably in a streaming loop, with updates as new data arrives from marine condition data aggregating system 100, for example.

Figure 6:
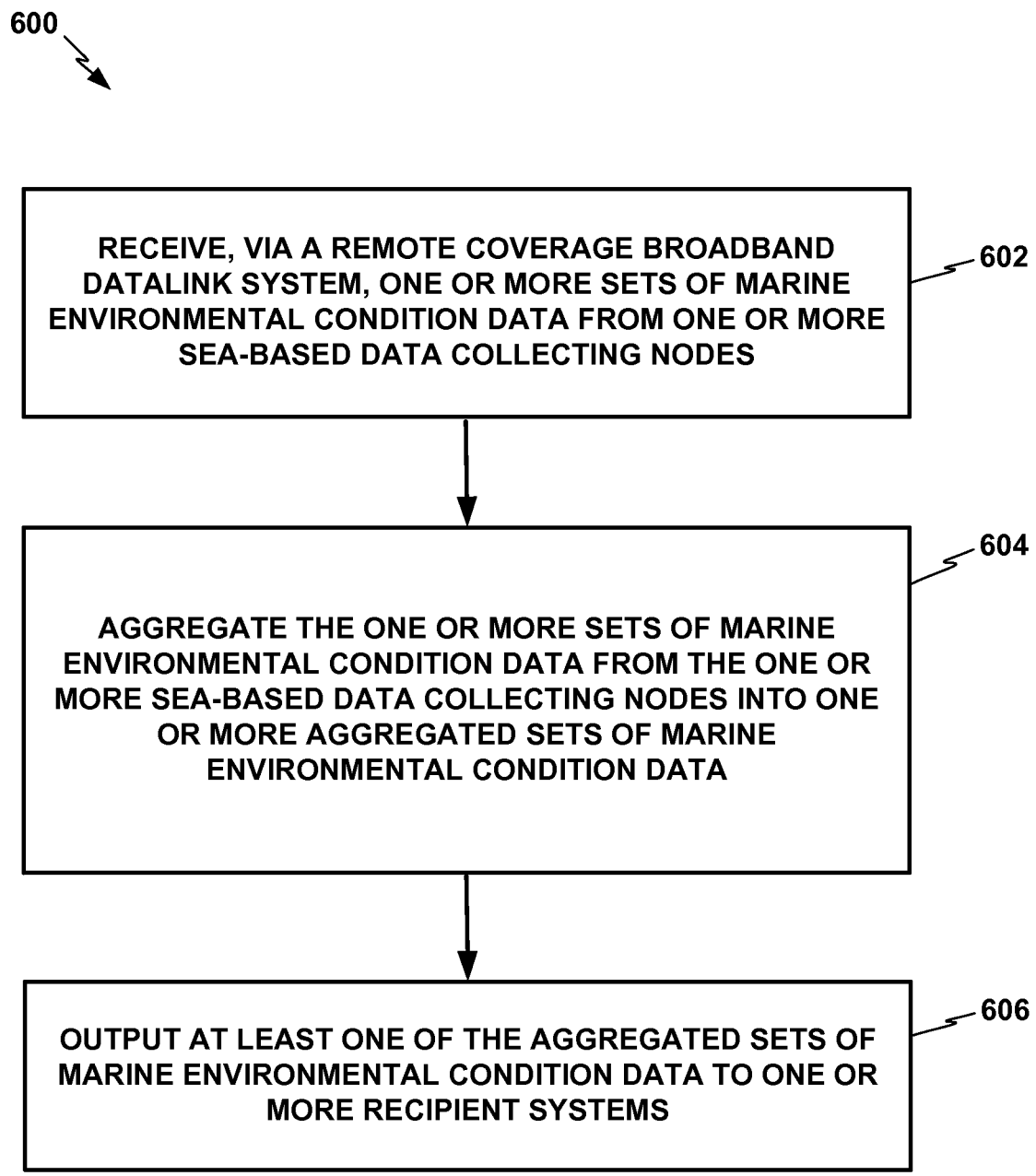
FIG. 6 shows a flowchart for an example method for aggregating and outputting an aggregated marine environmental condition data set, as may be implemented, performed, executed, and/or embodied by a marine environmental condition data aggregating system in various examples of this disclosure.

In the example of FIG. 6, graphical output 243, 244 shows volumes of clear weather ("CD") 302, volumes of light precipitation ("LP") 304, and volumes of convective weather ("CV") 306, which may include convective weather structure 99 as shown in FIG. 1. Horizontal graphical output 243 also shows an area of sea surface with high waves ("HW") 307, superimposed on the overlapping areas of weather structure 304, 306, and which may be due to sea state sensor data as opposed to weather radar data. In other examples, a graphical output may have representations of different weather and sea state conditions in different colors, and may be represented in any type of output, including a three-dimensional graphical output, for example. A recipient may thus receive weather and sea state information with longer range and higher resolution than they would otherwise be able to access. In cases where the recipient systems are onboard ships, the ship operators may thus be better enabled to plan and execute ship operations in light of an improved awareness of marine weather and sea state conditions.

FIG. 6 shows a flowchart for an example method 600 for aggregating and outputting an aggregated marine environmental condition data set, as may be implemented, performed, executed, and/or embodied by a marine environmental condition data aggregating system in various examples of this disclosure. Method 600 includes receiving, via a remote coverage broadband datalink system, one or more sets of marine environmental condition data from one or more sea-based data collecting nodes (e.g., marine environmental condition data aggregating system 100 receiving, via telecom sat 124, one or more sets of marine environmental condition data from ships 160, 170 or other sea-based data collecting nodes among data collecting nodes 140) (602).

Method 600 further includes aggregating the one or more sets of marine environmental condition data from the one or more sea-based data collecting nodes into one or more aggregated sets of marine environmental condition data (e.g., marine environmental condition data aggregating system 100, or portion/module 214 of marine environmental condition data aggregating module 110 thereof, aggregating the sets 166, 176, 166N, 176N, 196N of marine environmental condition data from ships 160, 170 or other sea-based data collecting nodes among data collecting nodes 140 into one or more aggregated sets 242, 242N of marine environmental condition data) (604). Method 600 further includes outputting at least one of the aggregated sets of marine environmental condition data to one or more recipient systems (e.g., marine environmental condition data aggregating system 100, or portion/module 216 of marine environmental condition data aggregating module 110 thereof, outputting aggregated set 242, 242N of marine environmental condition data to graphical display device 300 associated with, included in, or onboard ship 160 or 170 or another recipient system included among aggregated data recipients 142) (606).

In some examples, marine environmental condition data aggregating system 100 may generate aggregated marine environmental condition data outputs configured for a high-resolution display enabled for display of a three-dimensional (3D) view of marine weather and sea state in a selected area. This high-resolution display of the marine weather and sea state may be enabled for a high resolution in time and for a high range (e.g., above a selected distance threshold).

The techniques of this disclosure may be implemented in a device or article of manufacture comprising a computer-readable storage medium. The term "processor," as used herein may refer to any of the foregoing structure or any other structure suitable for processing program code and/or data or otherwise implementing the techniques described herein. Elements of marine environmental condition data aggregating system 100 and/or processors 102 thereof, and/or system elements for executing and/or storing marine environmental condition data aggregating module 110 or features thereof as disclosed above, may be implemented in any of a variety of types of solid state circuit elements, such as CPUs, CPU cores, GPUs, digital signal processors (DSPs), application-specific integrated circuits (ASICs), a magnetic nonvolatile RAM or other types of memory, a mixed-signal integrated circuit, a field programmable gate array (FPGA), a microcontroller, a programmable logic controller (PLC), a programmable logic device (PLD), a complex programmable logic device (CPLD), a system on a chip (SoC), a subsection of any of the above, an interconnected or distributed combination of any of the above, or any other integrated or discrete logic circuitry, or any other type of component or one or more components capable of being configured in accordance with any of the examples disclosed herein. One or more memory devices 104 may include any volatile or non-volatile media, such as a RAM, ROM, non-volatile RAM (NVRAM), electrically erasable programmable ROM (EEPROM), flash memory, and the like. One or more memory devices 104 may store computer readable instructions that, when executed by one or more processors 102, cause the one or more processors 102 to implement the techniques attributed herein to marine environmental condition data aggregating module 110.

Elements of marine environmental condition data aggregating module 110 may be programmed with various forms of software. Marine environmental condition data aggregating module 110 may be implemented at least in part as, or include, one or more executable applications, application modules, libraries, classes, methods, objects, routines, subroutines, firmware, and/or embedded code, for example. Elements of marine environmental condition data aggregating module 110 as in any of the examples herein may be implemented as a device, a system, an apparatus, and may embody or implement a method of aggregating and outputting environmental condition data, including for implementing example method 600 as described with reference to FIG. 6.

The techniques of this disclosure may be implemented in a wide variety of computing devices. Any components, modules or units have been described provided to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

An "aircraft" as described and claimed herein may include any fixed-wing or rotary-wing aircraft, airship (e.g., dirigible or blimp buoyed by helium or other lighter-than-air gas), suborbital spaceplane, spacecraft, expendable or reusable launch vehicle or launch vehicle stage, or other type of flying device. An "aircraft" as described and claimed herein may include any crewed or uncrewed craft (e.g., uncrewed aerial vehicle (UAV), flying robot, or automated cargo or parcel delivery craft). While some examples are described in terms of marine environmental condition data aggregating system 100 outputting aggregated data sets that are used to generate graphical marine environmental condition outputs to client graphical display device 300, in other examples, marine environmental condition data aggregating system 100 may communicate aggregated marine environmental condition data outputs to another system, component, device, software module, computer, or other feature. For example, in an automated navigation system on a sea-going ship, marine environmental condition data aggregating system 100 may communicate aggregated marine environmental condition data outputs to a software module, computer, embedded circuit, or other feature that performs automated navigation. In these examples, marine environmental condition data aggregating system 100 may generate outputs that may enable an automatic software-based navigation and/or piloting system to make navigation decisions based on accurate, wide-ranging, up-to-date, and high-resolution characterization of marine weather and sea state conditions.

Various illustrative aspects of the disclosure are described above. These and other aspects are within the scope of the following claims.

What is claimed is:

1. A system comprising:
  a communication interface configured to receive, from one or more sea-based data collecting nodes via a remote coverage broadband datalink system comprising a set of telecommunication satellites, one or more sets of marine environmental condition data, wherein the remote broadband datalink system further comprises a plurality of connections, and wherein each connection of the plurality of connections defines a link between each sea-based data collecting node of the one or more sea-based data collecting nodes and the communication interface; and
  one or more processors communicatively connected to one or more data stores, wherein the one or more processors are configured to:
    identify the one or more sets of marine environmental condition data received from the one or more sea-based data collecting nodes via the remote coverage broadband datalink system;
    index the one or more sets of marine environmental condition data in accordance with time references and geographical references associated with the respective one or more sets of marine environmental condition data;
    store the indexed data in the one or more data stores;
    aggregate, with reference to time references and geographical references associated with the indexed data, the indexed data into one or more aggregated sets of marine environmental condition data;
    store the one or more aggregated data sets in the one or more data stores;
    identify a present location of a sea-based recipient system associated with a subscriber of a plurality of subscribers;
    customize an aggregated set of marine environmental condition data for the sea-based recipient system based on the present location of the sea-based recipient system associated with the subscriber and based on a present time;
    output, via one or more telecommunication satellites of the set of telecommunication satellites, the customized aggregated set of marine environmental condition data to the sea-based recipient system associated with the subscriber, wherein at least one of the one or more sea-based data collecting nodes also comprises the sea-based recipient system, and wherein a size of the customized aggregated set of marine environmental condition data is smaller than a size of the one or more aggregated sets of marine environmental condition data such that the customized aggregated set of marine environmental condition data fits within a bandwidth limitation of the sea-based recipient system;
    maintain a subscriber policy configured to identify the sea-based recipient system as comprised in one or more of the sea-based data collecting nodes, wherein the subscriber policy identifies one or more subscribers of the plurality of subscribers with primarily real-time operational interest and one or more subscribers of the plurality of subscribers with primarily archival interest;
    customize one or more aggregated sets of marine environmental condition data for the one or more subscribers with primarily real-time operational interest based on present locations of the subscribers and based on present times; and
    customize aggregated sets of marine environmental condition data for the one or more subscribers with primarily archival interest based on selected archival data parameters.

2. The system of claim 1, wherein the marine environmental condition data comprises at least one of marine weather radar data or sea state sensor data,
  wherein the sea state sensor data comprises data on one or more of sea wave height, sea wave period, direction of sea currents, or sea water temperature.

3. The system of claim 1, wherein the one or more sea-based data collecting nodes comprise at least one of a ship; a platform; a submarine; a boat; and an automated sea-going device.

4. The system of claim 1, wherein the one or more processors are further configured to aggregate the one or more sets of marine environmental condition data in a three-dimensional volumetric marine environmental condition data store in accordance with time references and geographic references associated with the received marine environmental condition data.

5. The system of claim 1, wherein the one or more processors are further configured to:
   receive one or more sets of marine environmental condition data from at least one of one or more ground-based data collecting nodes, one or more air-based data collecting nodes, or one or more space-based data collecting nodes; and
   aggregate the one or more sets of marine environmental condition data from the at least one of one or more ground-based data collecting nodes, one or more air-based data collecting nodes, and one or more space-based data collecting nodes, in accordance with time references and geographical references associated with the one or more sets of marine environmental condition data from the at least one of one or more ground-based data collecting nodes, one or more air-based data collecting nodes, and one or more space-based data collecting nodes, together with the one or more sets of marine environmental condition data from the one or more sea-based data collecting nodes, into the aggregated set of marine environmental condition data,
   wherein the at least one of one or more ground-based data collecting nodes, one or more air-based data collecting nodes, and one or more space-based data collecting nodes comprise at least one of: a ground-based weather radar station; an aircraft; a drone; a weather balloon; a sub-orbital sounding rocket; a weather satellite; or a sea state sensor satellite.

6. The system of claim 1, wherein the one or more processors are communicatively connected to one or more data stores, and the one or more processors are further configured to:
   identify data received via the remote coverage broadband datalink system;
   aggregate the received data into one or more aggregated data sets with reference to time references and geographical references associated with the received data; and
   store the one or more aggregated data sets in the one or more data stores.

7. The system of claim 1, wherein the one or more processors are communicatively connected to one or more data stores, and the one or more processors are further configured to: retrieve data from one or more aggregated data sets in the one or more data stores in accordance with at least one of: the subscriber policy, an output policy, and a request; and
   output the data from the one or more aggregated data sets in accordance with the at least one of the subscriber policy, the output policy, or the request.

8. The system of claim 1, wherein the communication interface is further configured to receive data indicative of a convective weather structure from at least one of the one or more sea-based collecting nodes via the remote coverage broadband datalink system.

9. The system of claim 1, wherein the one or more sea-based data collection nodes comprise a plurality of sea-based data collection nodes, and wherein the one or more processors are configured to aggregate the one or more sets of marine environmental condition data by combining data from more than one sea-based data collection node of the plurality of sea-based data collection nodes, the more than one sea-based data collection node covering a same or overlapping geographical areas at a same time.

10. The system of claim 1, wherein the one or more sets of marine environmental condition data from the one or more sea-based data collecting nodes comprise at least a first set of marine environmental condition data and a second set of marine environmental condition data from at least a first sea-based data collecting node, wherein the one or more processors are further configured to:
    receive the at least first and second sets of marine environmental condition data from the at least first sea-based data collecting node via the remote coverage broadband datalink system comprising the one or more telecommunication satellites; and
    aggregate the at least first and second sets of marine environmental condition data from at least the first sea-based data collecting node into the one or more aggregated sets of marine environmental condition data.

11. The system of claim 1, wherein the one or more sea-based data collecting nodes comprise at least a first sea-based data collecting node and a second sea-based data collecting node proximate to the first sea-based data collecting node during at least a temporary interval of proximity in a geographic area, and the one or more sets of marine environmental condition data comprise at least a first set of marine environmental condition data from the first sea-based data collecting node and at least a first set of marine environmental condition data from the second sea-based data collecting node both collected during the interval of proximity, wherein the one or more processors are further configured to:
    receive the at least first set of marine environmental condition data from the first sea-based data collecting node and the at least first set of marine environmental condition data from the second sea-based data collecting node via the remote coverage broadband datalink system comprising the one or more telecommunication satellites; and
    aggregate the at least first set of marine environmental condition data from the first sea-based data collecting node and the at least first set of marine environmental condition data from the second sea-based data collecting node into the one or more aggregated sets of marine environmental condition data in accordance with time references and geographical references associated with the interval of proximity and the geographic area.

12. The system of claim 1, wherein the one or more processors are configured to aggregate the one or more sets of marine environmental condition data asynchronously from identifying the data, indexing the data, and storing the indexed data.

13. A method comprising:
    receiving, by one or more processors, via a remote coverage broadband datalink system comprising a set of telecommunication satellites, one or more sets of marine environmental condition data from one or more sea-based data collecting nodes, and the broadband datalink system further comprises a communication interface configured to communicate data from transmissions from the one or more sea-based data collecting nodes via the one or more telecommunication satellites to the one or more processors, wherein the remote broadband datalink system further comprises a plurality of connections, and wherein each connection of the plurality of connections defines a link between each sea-based data collecting node of the one or more sea-based data collecting nodes and the communication interface;

identifying, by the one or more processors, the one or more sets of marine environmental condition data received from the one or more sea-based data collecting nodes via the remote coverage broadband datalink system;

indexing, by the one or more processors, the one or more sets of marine environmental condition data in accordance with time references and geographical references associated with the respective one or more sets of marine environmental condition data;

storing, by the one or more processors, the indexed data in the one or more data stores;

aggregating, by the one or more processors and with reference to time references and geographical references associated with the indexed data, the indexed data into one or more aggregated sets of marine environmental condition data;

storing, by the one or more processors, the one or more aggregated data sets in the one or more data stores;

identifying, by the one or more processors, a present location of a sea-based recipient system associated with a subscriber of a plurality of subscribers;

customizing, by the one or more processors, an aggregated set of marine environmental condition data for the sea-based recipient system based on the present location of the sea-based recipient system associated with the subscriber and based on a present time; and outputting, by the one or more processors via one or more telecommunication satellites of the set of telecommunication satellites, a customized aggregated set of marine environmental condition data to the sea-based recipient system associated with the subscriber, wherein at least one of the one or more sea-based data collecting nodes also comprises the sea-based recipient system, and wherein a size of the customized aggregated set of marine environmental condition data is smaller than a size of the one or more aggregated sets of marine environmental condition data such that the customized aggregated set of marine environmental condition data fits within a bandwidth limitation of the sea-based recipient system;

maintaining, by the one or more processors, a subscriber policy configured to identify the sea-based recipient system as comprised in one or more of the sea-based data collecting nodes, wherein the subscriber policy identifies one or more subscribers of the plurality of subscribers with primarily real-time operational interest and one or more subscribers of the plurality of subscribers with primarily archival interest;

customizing, by the one or more processors, one or more aggregated sets of marine environmental condition data for the one or more subscribers with primarily real-time operational interest based on present locations of the subscribers and based on present times; and customizing, by the one or more processors, aggregated sets of marine environmental condition data for the one or more subscribers with primarily archival interest based on selected archival data parameters.

14. The method of claim 13, further comprising:

retrieving data from one or more aggregated data sets in the one or more data stores in accordance with at least one of: the subscriber policy, an output policy, and a request; and outputting the data from the one or more aggregated data sets in accordance with the at least one of the subscriber policy, the output policy, or the request.

* * * * *